United States Patent

[11] 3,617,919

[72] Inventor Albert Andrews Clark
Woburn, Mass.
[21] Appl. No. 846,028
[22] Filed July 30, 1969
[45] Patented Nov. 2, 1971
[73] Assignee RCA Corporation

[54] CANONICAL ORTHOGONAL FILTER
2 Claims, 2 Drawing Figs.

Figure 1:
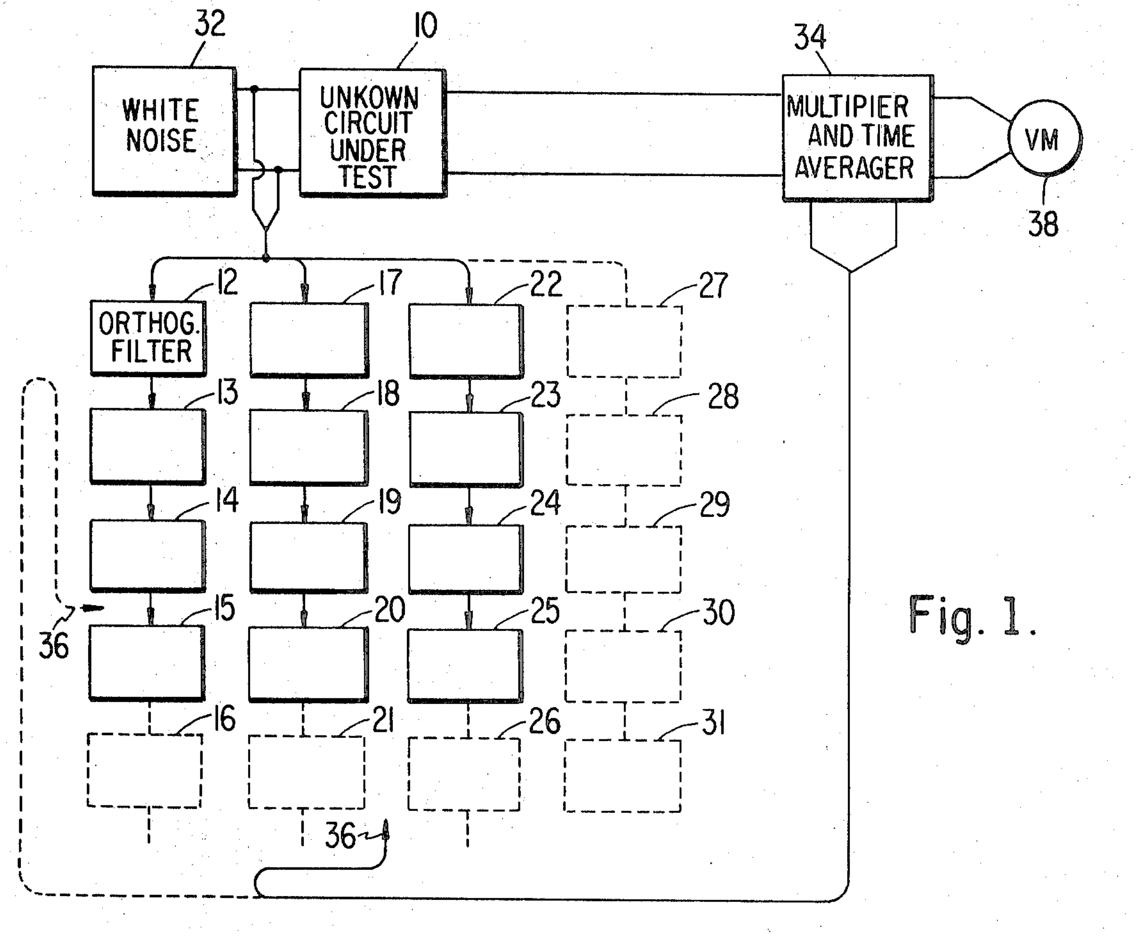

[52] U.S. Cl. .......... 330/107, 330/69
[51] Int. Cl. .......... H03f 1/36
[50] Field of Search .......... 330/30 D, 31, 28, 69, 107, 109; 328/167; 333/70 R

[56] References Cited
UNITED STATES PATENTS
3,519,947 7/1970 Phelen .......... 330/30

OTHER REFERENCES
Comer et al., " Inductorless Bandpass Characteristics Using All-pass Networks," IEEE Transactions on Circuit Theory, 1968 pp. 501-503 330-109
Mitra, " Synthesizing Active IEEE Spectrum January 1969 pp. 47-63 330-109

*Primary Examiner*—Roy Lake
*Assistant Examiner*—James B. Mullins
*Attorney*—Edward J. Norton ABSTRACT: A canonical orthogonal filter is accurately synthesized from a particular transfer function. Filters are provided having a first and second resistor respectively connected to first and second input terminals of a differential amplifier. A third resistor is connected from one amplifier input terminal to a point of reference potential, and the parallel combination of a fourth resistor and a capacitor is connected from the other input terminal of the amplifier to the output terminal of the amplifier which is also the output terminal of the filter.

INVENTOR.
Albert A. Clark
BY
Edward J. Norton
ATTORNEY

CANONICAL ORTHOGONAL FILTER

The invention herein described was made in the course of or under a contract or subcontract thereunder with the Department of the Navy.

This invention relates to canonical filters.

In certain investigations into the nature of an unknown circuit, white electrical noise is applied to unknown circuits and also to one or more of a plurality of orthogonal filters. Two filters are orthogonal with respect to each other if the integral over the limits zero to infinity (of time) of the product of the respective responses of the filters to a unit impulse applied to the inputs of the filters is equal to zero. A unit impulse is the limiting value of an impulse whose amplitude is $a$ and whose length is $1/a$ as $a$ approaches infinity. Since an orthogonal filter can be cascaded with a known filter to provide an output of the cascaded filters which is orthogonal with respect to the output of the known filter the added or cascaded filter may be called an orthogonal filter building block. The output wave from the unknown circuit and from the various combinations of the filters are applied to a correlation circuit comprising a multiplier and time-averaging circuit and the voltage output of the multiplier and time-averaging circuit is measured. Simultaneous equations can be set up using the measured results, which may be solved to determine the type and size of the elements in the unknown circuit, only however if the filter circuits are orthogonal. Such a system is disclosed in U.S. Pat. No. 3,102,213, entitled "White Noise Fault Detection System."

Known orthogonal filter circuits are usually designed by a cut-and-try method whereby accurately orthogonal circuits are difficult to realize. Use of filter circuits which are not accurately orthogonal in the described method of analyzing an unknown circuit leads to incorrect results. Furthermore, since known orthogonal circuits have many elements, the difficulty of providing accurate orthogonal filter circuits is multiplied. Furthermore, if the number of elements in the circuit is a minimum, not only is the filter more economical to make but the filter is easier to design.

It is an object of this invention to provide an accurately orthogonal filter circuit building block.

It is another object of this invention to provide an orthogonal filter circuit building block having a minimum number of reactive circuit elements as well as a minimum number of total parts.

In accordance with this invention, a filter is provided comprising a first and a second resistor connected between an input terminal of the filter and respective input terminals of a differential amplifier. A third resistor is connected between the junction of the second resistor and the input terminal of the differential amplifier and a point of reference potential such as ground. A fourth resistor, shunted by a capacitor, is connected between the junction of the first resistor and the input terminal of the differential amplifier and the output terminal of the differential amplifier which is the output terminal of the filter. The values of the resistors and of the capacitor are chosen to make the filter orthogonal.

Figure 2:
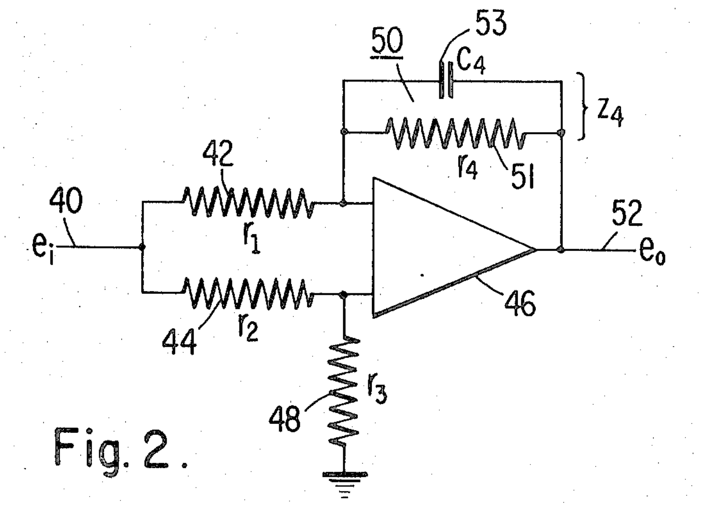

The invention will be better understood upon reading the following description in which FIG. 1 is a block diagram of a circuit in which a plurality of orthogonal filters may be used to determine the elements comprising a circuit under test, and FIG. 2 is a circuit diagram of an orthogonal filter building block in a canonical form.

FIG. 1 diagrammatically shows a test setup for an unknown circuit 10 using a plurality of orthogonal filter circuits 12 to 31. The orthogonal filters 12 and 31 are arranged in rows and columns. While only five filters are shown in each column, the filters 16, 21, 26 and 31 are shown in dotted lines to indicate that there may be more filters in each column. In a practical test setup, there may be a hundred filters, more or less in each column of filters thereof. While only four columns of filters are shown, the rectangles indicating the filters 27 and 31 are shown in dotted lines to indicate that there may be more than four columns of filters. In a practical test setup there may be ten or more columns of figures. The filters in each column are cascaded.

A source 32 of white noise is provided. For the electrical wave appearing at the output of the source 32 to be white, the output wave must include all frequencies from zero to infinity and the amount of energy in all the frequencies must be equal to each other. For practical purposes it is sufficient that the output of the source 32 contain all wavelengths from zero to about ten million hertz, and that the energy at the various frequencies differ by no more than 3 decibels. The output wave from the source 32 is applied to the input terminals of the unknown circuit 10 and also to the input terminals of each of the first filters 12, 17, 22 and 27 of the cascaded filters in each column. The output of the unknown circuit 10 is applied to one pair of input terminals of a multiplier and time averager 34 which may, for example, comprise a modulator. The other pair of input terminals of the multiplier and time averager 34 are connected to a tap 36. The tap 36, as indicated by both the solid and dotted portion of the line leading thereto, may be connected to any output connection of any filter or in any column of filters. For each connection of the tap to an output connection of a filter, the voltage shown by the meter 38 is read. The filters each have different low- and high-cutoff frequencies. Each of the first filters 12, 17, 22 and 27 of the several columns are low-pass filters having different cutoff frequencies. Simultaneous equations can be set up using the values of voltages shown by the voltmeter 38 for each filter or combination thereof that intervenes between the source 32 and the multiplier 34. If the filters are orthogonal, the various values of voltages are independent of each other, whereby the simultaneous equations can be solved in a known manner as by a computer. Solution of the problem tells what elements comprise the unknown circuit 10 and what are their connections and their values. If the filters are not accurately orthogonal the solution will be incorrect.

A canonical form of an orthogonal filter that can be used with proper choice of the several elements for the several filters 12 to 31 of FIG. 1 is shown in FIG. 2. Respective resistors 42 and 44 connect an input terminal 40 of the described filter to respective input terminals of an amplifier 46. A resistor 48 connects the junction of the resistor 44 and the input terminal of the amplifier 46 to a point of reference potential such as ground. An impedance 50 consisting of the shunt combination of a resistor 51 and a capacitor 53 is connected between the junction of the resistor 42 and an input terminal of the amplifier 46 to the output terminal of the amplifier 46, which is also an output terminal of the described filter. The resistors 42, 44 and 48 and the impedance 50 may also be respectively indicated as $r_1$, $r_2$, $r_3$ and $z_4$ for convenience.

Turning again to FIG. 1, it is desired that cascaded filters 12 and 13 be orthogonal with respect to filter 12 for example, and that, furthermore, any number of cascaded filters which include the first filter in a column be orthogonal with respect to any other number of cascaded filters in the same column which also includes the first filter. The filters 13–16 and 17–21 and 23–26 and 28–31 may therefore be called orthogonal filter building blocks.

A filter is an orthogonal filter building block if its transfer characteristic $$H_{(s)}=\frac{E_o(s)}{E_i(s)}=k\frac{s-a}{s+b},$$

where $E_o(s)$ is the output voltage Laplace transform of the filter, $E_i(s)$ is the input voltage Laplace transform of the filter, $k$ is a constant, and $s$ is a complex frequency variable of the form $\sigma+j2\rho b$, $\sigma$ being a real number and $f$ being a suitable frequency, and where frequencies $a$ and $b$ represent points on the $s$ plane. The $5$ plane is defined as a plot of $\sigma$ plotted along the horizontal axis against $2\rho f$ plotted along the vertical axis, the points in the $s$-plane indicating all possible values of s. The transfer characteristic $h(s)$ given above will have a zero value at point a and an infinite value at point $b$. For the filter of FIG. 2 to be an orthogonal building block, its transfer characteristic, $$\left[\frac{r_3}{r_2+r_3}\left(1+\frac{z_4}{r_1}\right)\right]-\frac{z_4}{r_1},$$

must be equal to $$k\frac{s-a}{s+b}.$$

In obtaining the values of the several elements of FIG. 2, first pick the limiting high and low frequencies $a$ and $b$ respectively that in the judgment of the user are useful. This fixes $k$ since $k$ is equal to the square root of the ratio of $b$ to a. Resistor $r_1$ is picked of a convenient size considering the resistance of the output stage feeding into the filter and that the effect of stray capacity is greater for big resistors than for small resistors and that small resistors handle less power than big resistors. Having chosen the value of $r_1$, $r_4$ is obtained from the formula $$r_1=r_4\left(\frac{1-k}{k}\right)\frac{b}{a+b}.$$

. Then $c_4$ in farads is equal to the inverse product of $r_4$ in ohms and $b$ in hertz. The resistors $r_2$ and $r_3$ may have any values that satisfies the equation $$r_2=r_3\left(\frac{1-k}{k}\right).$$

. However to minimize the offset of the differential amplifier 46, the impedance to ground of the paths from the two input terminals of the differential amplifier 46 are equalized as nearly as possible by making the parallel impedance of $r_1$ and $r_4$ as nearly equal to the parallel impedance of $r_2$ and $r_3$ as is possible considering the limitations put on these values by the other equations.

I claim:

1. An accurate canonical orthogonal filter building block comprising
   - an amplifier having a pair of input terminals and an output terminal,
   - a connection consisting of a first resistor connected between a filter input terminal and one input terminal of said amplifier,
   - a connection consisting of a second resistor connected between said filter input terminal and the other input terminal of said amplifier,
   - a connection consisting of a third resistor connected between the junction of said second resistor and the input terminal of said amplifier and a point of reference potential, and
   - a connection consisting of the parallel connection of a fourth resistor and a capacitor connected between the junction of the first resistor and the input terminal of said amplifier and the output terminal of said amplifier, said output terminal of said amplifier being an output terminal of said filter,
   - said canonical filter having a voltage transfer function satisfying the equation $$\left[\frac{r_3}{r_2+r_3}\left(1+\frac{z_4}{r_1}\right)\right]-\frac{z_4}{r_1}=k\frac{s-a}{s+b}$$

wherein $r_1$, $r_2$, and $r_3$ are respectively the first, second, and third resistors, $2_4$ is the parallel connection of the fourth resistor and the capacitor, $a$ and $b$ are the low and the high limiting frequencies of the filter, $s$ is a useful number and $k$ is equal to the square root of the ratio $b$ to $a$.

2. The invention as expressed in claim 1 in which the parallel resistance of $r_1$ and $r_4$ and the parallel resistance of $r_2$ and $r_3$ are made as nearly equal as is possible consistant with the equation in claim 1.

* * * * *

UNITED STATES PATENT OFFICE

CERTIFICATE OF CORRECTION

Patent No. 3,617,919 Dated November 2, 1971

Inventor(s) Albert A. Clark

It is certified that error appears in the above-identified patent and that said Letters Patent are hereby corrected as shown below:

| | |
|---|---|
| Column 1, line 28 | "U.S. Patent No. 3,102,213" should be --U.S. Patent No. 3,102,231-- |
| Column 2, line 57 | "17-21" should be -- 18-21 -- |
| Column 2, line 71 | " $\sigma+j2\rho b$" should be -- $\sigma+j2\pi f$-- |
| Column 2, line 73 | "5 plane" should be --s plane-- |
| Column 2, line 74 | "$2\rho f$" should be --$2\pi f$-- |
| Column 3, line 1 | "h(s)" should be --H(s)-- |
| Column 4, line 30 | "$2_4$" should be -- $Z_4$ -- |

Signed and sealed this 9th day of May 1972.

(SEAL)
Attest:

EDWARD M.FLETCHER,JR.
Attesting Officer

ROBERT GOTTSCHALK
Commissioner of Patents